United States Patent
Goupil et al.

(10) Patent No.: US 8,165,729 B2
(45) Date of Patent: Apr. 24, 2012

(54) METHOD AND DEVICE FOR ESTIMATING THE FORCES EXERTED ON A CONTROL SURFACE OF AN AIRCRAFT

(75) Inventors: Philippe Goupil, Beaupuy (FR); Christophe Rougelot, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1208 days.

(21) Appl. No.: 11/934,289

(22) Filed: Nov. 2, 2007

(65) Prior Publication Data
US 2011/0004361 A1 Jan. 6, 2011

(30) Foreign Application Priority Data
Nov. 6, 2006 (FR) ...................................... 06 09655

(51) Int. Cl.
*G01C 23/00* (2006.01)
(52) U.S. Cl. ........................................ 701/3; 244/99.11
(58) Field of Classification Search ........................ 701/3
See application file for complete search history.

(56) References Cited

U.S. PATENT DOCUMENTS

| | | | | |
|---|---|---|---|---|
| 5,374,011 A * | 12/1994 | Lazarus et al. | ............... | 244/99.8 |
| 6,140,942 A * | 10/2000 | Bragg et al. | ................... | 340/962 |
| 6,548,794 B2 | 4/2003 | Facciano et al. | ............... | 244/3.1 |
| 6,685,138 B1 * | 2/2004 | Krantz | ........................ | 244/99.5 |
| 6,729,577 B2 * | 5/2004 | Morgenstern | ............... | 244/45 R |
| 6,796,526 B2 * | 9/2004 | Boehringer | .................. | 244/78.1 |
| 6,824,099 B1 * | 11/2004 | Jones | ........................ | 244/99.12 |
| 6,863,242 B2 * | 3/2005 | Van De Kreeke et al. | .... | 244/7 R |
| 7,896,288 B2 * | 3/2011 | Sauvinet | ...................... | 244/75.1 |
| 2002/0130216 A1 * | 9/2002 | Facciano et al. | ............. | 244/3.24 |
| 2003/0066934 A1 * | 4/2003 | Bolonkin | ................... | 244/153 R |
| 2004/0056150 A1 * | 3/2004 | Morgenstern | ............... | 244/45 R |
| 2004/0099763 A1 * | 5/2004 | Boehringer | .................... | 244/10 |
| 2005/0118952 A1 * | 6/2005 | Cox et al. | ........................ | 455/62 |
| 2005/0184196 A1 * | 8/2005 | Shmilovich et al. | ........... | 244/199 |
| 2007/0045476 A1 * | 3/2007 | Shmilovich et al. | ........ | 244/199.4 |
| 2007/0114325 A1 * | 5/2007 | Baldwin | .................... | 244/17.11 |
| 2007/0198225 A1 * | 8/2007 | Roach et al. | ................... | 702/189 |
| 2007/0271008 A1 * | 11/2007 | Ciholas et al. | ................... | 701/3 |
| 2008/0035798 A1 * | 2/2008 | Kothera et al. | ............... | 244/212 |

OTHER PUBLICATIONS

Preliminary Search Report dated May 11, 2007.
E. Reichenbach. "An Evaluation Technique for an F7A-18 Aircraft Loads Model Using F/A-18 Systems Research Aircraft Flight Data," NASA/TM-2000-209028, Jul. 2000, pp. 1-24.

* cited by examiner

*Primary Examiner* — Helal A Algahaim
(74) *Attorney, Agent, or Firm* — Dickinson Wright PLLC

(57) ABSTRACT

Disclosed is a method and device for estimating forces exerted on at least one aircraft control surface. The method includes steps of, and the device includes components that carry out steps that include: generating current aircraft flight data; determining, from the generated aircraft flight data, a value B1 based on current deflection data and geometrical characteristics of a lever arm actuator of the at least one aircraft control surface; calculating, from the determined value B1, at least one hinge moment; summing each calculated hinge moment; and dividing the sum by the value B1 to obtain an estimate of the forces exerted on the least one aircraft control surface.

12 Claims, 3 Drawing Sheets

METHOD AND DEVICE FOR ESTIMATING THE FORCES EXERTED ON A CONTROL SURFACE OF AN AIRCRAFT

The present invention relates to a method and a device for estimating the forces exerted on at least one control surface of an aircraft, in particular of a transport plane.

Within the framework of the present invention, it is considered that said control surface is a moveable aerodynamic surface, called an airfoil (such as an aileron or a spoiler for example), which is capable of being actuated by at least one associated actuator, during a flight of the aircraft, in such a way as to act on the behavior of said aircraft in flight.

Although not exclusively, the present invention applies more particularly to the activation of a dual pressurization specified hereinbelow of an aircraft airfoil or to the detection (also specified hereinbelow) of oscillatory faults in flight control systems.

In particular, to improve the control capability of the aircraft, as well as the flight safety, it may be necessary to accurately ascertain the various forces exerted on at least one control surface of said aircraft, such as a fin or elevator for example.

The present invention relates to a method ma-king it possible to estimate, in an accurate and low-cost manner, the forces exerted during the flight of an aircraft on at least one of its control surfaces, said control surface being capable of being actuated in a standard fashion by at least one actuator.

For this purpose, according to the invention, said method is noteworthy in that the following series of successive step-s is carried out automatically:
a) the current values of data relating to the aircraft and to its flight are generated, in particular data which convey the attitude, geometry, speed and/or trajectory of the aircraft;
b) the value of a lever arm of the actuator of the control surface in question is determined on the basis of the current value of the deflection of this control surface and of geometrical characteristics of the latter;
c) with the aid of said current values, at least some of the following hinge moments that are capable of being generated on the control surface are calculated:
  c1) an aerodynamic hinge moment which depends on the current values of the dynamic pressure, the local incidence of the control surface, and the deflection of said control surface and where appropriate the deflection of a moveable support of the control surface;
  c2) a hinge moment generated by the mass of the control surface, which depends on the current value of the load factor and on the distance between a moment axis and the center of gravity of said control surface, as well as the mass of said control surface; and
  c3) an internal hinge moment specified hereinbelow;
d) the various hinge moments calculated in step c) are summed; and
e) the sum obtained in step d) is divided by the value of the lever arm, determined in step b), in such a way as to obtain an estimate of the forces exerted on said control surface.

Thus, by virtue of the invention, a particularly accurate estimate of the various forces exerted on a control surface of an aircraft is obtained. Moreover, this estimate of the forces is capable of being achieved in real time, thereby making it possible to improve the control capability and safety of the aircraft.

Furthermore, as specified hereinbelow, the implementation of the method in accordance with the present invention does not require any specified sensor or gauge, since it uses the current values of data which are generally already present on the aircraft. Also, the implementation of the present invention has no negative impact on the mass and, moreover, it is of low cost.

Advantageously, in step b), said value Bl of the lever arm is determined with the aid of the following expression:

$$Bl = R.\sin(a\cos[(R-L.\cos(BO+\delta x))/\sqrt{L^2+R^2-2.L.R.\cos(BO+\delta x)}])$$

in which:
in which:
  $\delta x$ is the current value of the deflection of the control surface;
  R represents the distance between a hinge line and a point of attachment of a rod of the actuator to the control surface;
  L represents the distance between a point of attachment of the actuator to a structure of the aircraft and said hinge line; and
  BO represents the angle between the segments defining the distances R and L, when the control surface is not deflected.

Furthermore, advantageously, in step c1), the aerodynamic hinge moment M1 is determined with the aid of the following expression:

$$M1 = Pdyn.V\delta x.Ki.(b0 + b1.i\delta x + b2.\Delta\delta x + b3.\delta x + \Delta NL)$$

in which:
  Pdyn is the current value of the dynamic pressure;
  $i\delta x$ is the current value of the local incidence of the control surface;
  $\delta x$ is the current value of the deflection of the control surface;
  $V\delta x$ is a reference volume of the control surface;
  Ki, $\Delta NL$, b0, b1, b2 and b3 are coefficients; and
  $\Delta\delta x$ is the current value of the deflection of a moveable support of the control surface.

Moreover, advantageously, in step c2), the hinge moment M2 generated by the mass of the control surface is determined with the aid of the following expression:

$$M2 = \|\vec{n}\|.m\delta x.d\delta x.g$$

in which:
  $\|\vec{n}\|$ is the current value of the load factor;
  $m\delta x$ is the mass of the control surface;
  $d\delta x$ represents the distance between a moment axis and the center of gravity of the control surface; and
  g is the gravitational acceleration.

Furthermore, advantageously, in step c3), the internal hinge moment M3 is determined with the aid of the following expression:

$$M3 = Ka.v^2.Bl$$

in which:
  Ka is a damping coefficient of an auxiliary actuator of the control surface;
  v is the speed of the rod of this auxiliary actuator; and
  Bl is the lever arm.

This internal hinge moment illustrates the frictional rubbing of the auxiliary actuator in damped mode, when the control surface is capable of being actuated by two actuators mounted in parallel (and called respectively the actuator and auxiliary actuator hereinabove).

To facilitate the implementation of the method in accordance with the invention, advantageously, in step c), only those of said possible hinge moments (in particular M1, M2 and M3) that are characteristic of the control surface considered are calculated, that is to say those which have a significant influence on the final estimate achieved. This makes it possible in particular to reduce the calculation volume and time by not calculating the negligible hinge moments.

It will be noted that, in the remainder of the description, the index x which is present in the above expressions (Vδx, iδx, Δδx, dδx, mδx and δx) not among by in particular) and which corresponds to general definition, is replaced by:

an index p, when the control surface considered (in particular an aileron) acts on the roll axis;

an index r when the control surface considered (in particular a fin) acts on the yaw axis;

an index q, when the control surface considered (in particular an elevator) on the pitch axis.

In a first embodiment, wherein said control surface corresponds to an elevator, and wherein in step d), the following sum is calculated:

$$MT\delta q = Pdyn.V\delta q.(b0+b1.i\delta q+b2.\Delta\delta q+b3.\delta q+\Delta NL)+\|\vec{n}\|.m\delta q.d\delta q.g$$

In a second embodiment, wherein said control surface corresponds to a fin, and wherein in step d), the following sum is calculated:

$$MT\delta r = Pdyn.V\delta r.Ki.(b1.i\delta r+b3.\delta r+\Delta NL)$$

Furthermore, in a third embodiment, wherein said control surface corresponds to an aileron, and wherein in step d), the following sum is calculated $$MT\delta p = Pdyn.V\delta p.(b0+b1.i\delta p+b3.\delta p+\Delta NL)+\|\vec{n}\|.m\delta p.d\delta p.g+Ka.v^2.Bl$$

A first application of the present invention can relate to the activation of a dual pressurization relating to an aircraft control surface, for example an elevator or a fin. It is known that in general, the airfoils can be actuated by two actuators, which are mounted in parallel and which may be either in active mode, or in damped mode. A master computer carries out the slaving by sending a control current to the actuator which is active. The other actuator, which is slaved by a slave computer, is forced in damped mode to follow, without resistance, the movement of the airfoil. In certain particular cases, the airfoil may experience very sizeable antagonist loads which prevent it from attaining the instructed position with sufficient accuracy, or even which disable the airfoil. The two actuators are then used simultaneously in active mode, so as to have sufficient power to actuate the airfoil. In this case one speaks of dual pressurization. To activate such dual pressurization, it is necessary to accurately ascertain all the loads exerted on the airfoil so as to know whether they can be countered by a single actuator or whether the activation of the second actuator is necessary. The method in accordance with the invention makes it possible to accurately estimate these loads (or forces), and it can therefore be used to control activation of an airfoil dual pressurization. The aforesaid first and second embodiments of the method in accordance with the invention, which relate respectively to an elevator and to a fin, are appropriate to such a first application of the present invention.

The method in accordance with the invention may also be applied to the detection of oscillatory faults in a chain for the positional slaving of a control surface of an aircraft, in particular of an aileron. It is known that, in a slaving chain, that is to say from a flight control computer up to the control surface, numerous electronic components are found which are capable of generating, in fail mode, a parasitic signal which causes the control surface to oscillate. This phenomenon is also called an oscillatory fault. When it manifests itself in the passband of the actuator, its consequences may be catastrophic (generation of excessive load beyond the design ratings). It is therefore necessary to detect and pacify very rapidly any oscillatory fault of this type. To do this, the actual operation of the chain is compared with reference operation expected in the absence of any fault. More precisely, the actual position of the control surface is compared with a position estimated by a behavioral model (which is excited at input by the setpoint of the slaving loop) of this control surface.

The estimation of the forces exerted on the control surface, obtained by virtue of the present invention, makes it possible to improve the quality of this behavioral model and hence the effectiveness of said detection of oscillatory faults. It will be noted that the third aforesaid embodiment (relating to an aileron) is particularly appropriate to this second application.

The present invention also relates to a device for estimating the forces exerted on at least one control surface of an aircraft, which is capable of being actuated by at least one actuator.

According to the invention, said device is noteworthy in that it comprises:

first means for receiving the current values of data relating to the aircraft and to its flight;

second means for determining the value of a lever arm of the actuator on the basis of the current value of the deflection of the control surface and of geometrical characteristics of the latter;

third means for calculating with the aid of said current values, at least some of the following hinge moments that are capable of being generated on the control surface:

an aerodynamic hinge moment which depends on the current values of the dynamic pressure, the local incidence of the control surface, and the deflection of said control surface;

a hinge moment generated by the mass of the control surface, which depends on the current value of the load factor, as well as the mass of said control surface; and an internal hinge moment;

fourth means for summing the various hinge moments calculated by said third means; and fifth means for dividing the sum calculated by said fourth means, by the value of the lever arm, determined by said second means, in such a way as to obtain an estimate of the forces exerted on said control surface.

The aforesaid device can be integrated into a flight control computer of an aircraft (of the type with electric flight controls).

Said device can also form part of a system which comprises, moreover, means for determining said current values of the data relating to the aircraft and to its flight and for transmitting these current values to said first means of said device. These means already exist in general on an airplane so that the cost of said system is low.

The figures of the appended drawing will elucidate the manner in which the invention may be embodied. In these figures, identical references denote similar elements.

Figure 1:
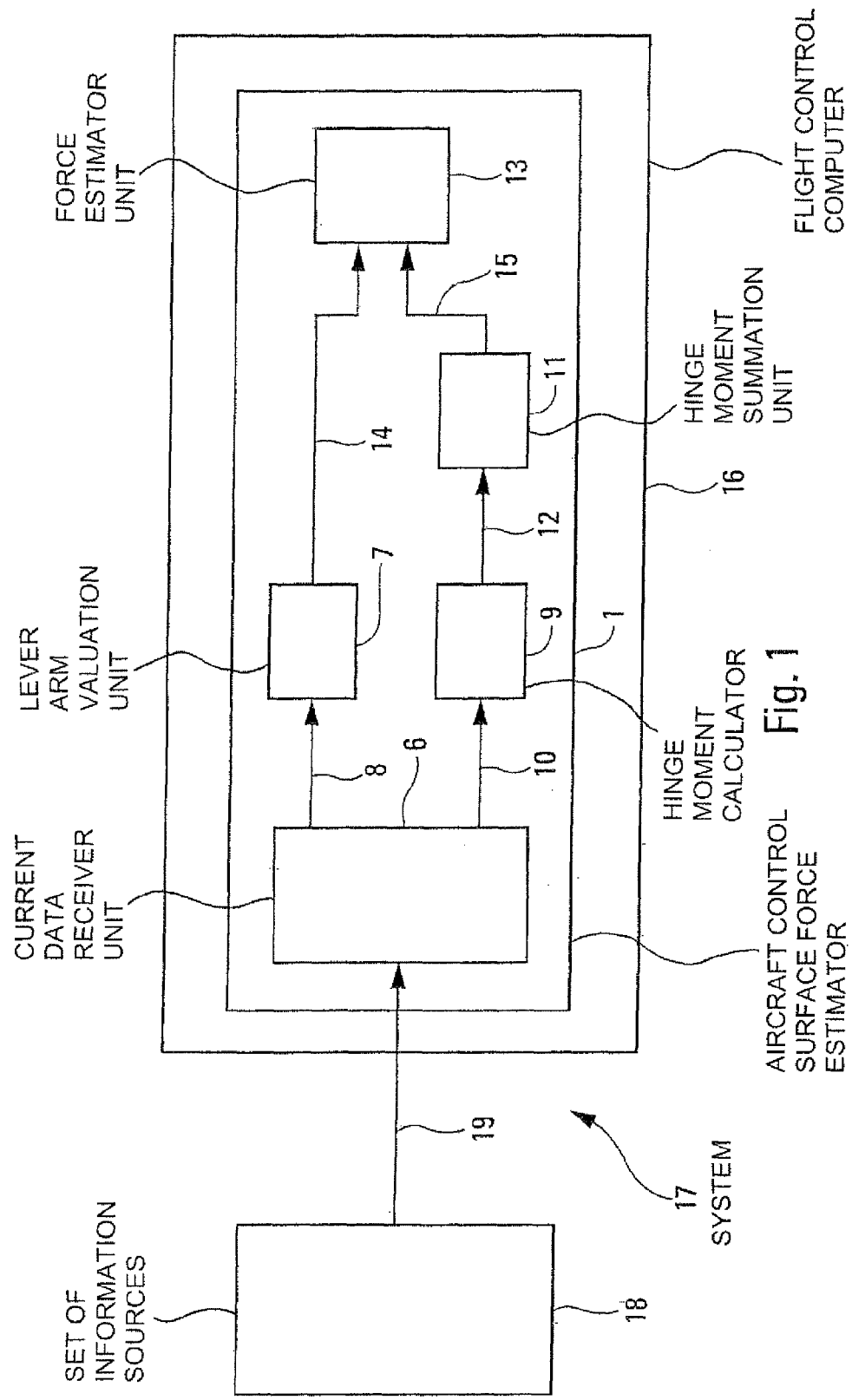
FIG. 1 is the schematic diagram of a device in accordance with the invention.

The device 1 in accordance with the invention and represented diagrammatically in FIG. 1 is intended to estimate the forces exerted on at least one control surface SC of an aircraft A in particular of a transport plane.

Figure 2:
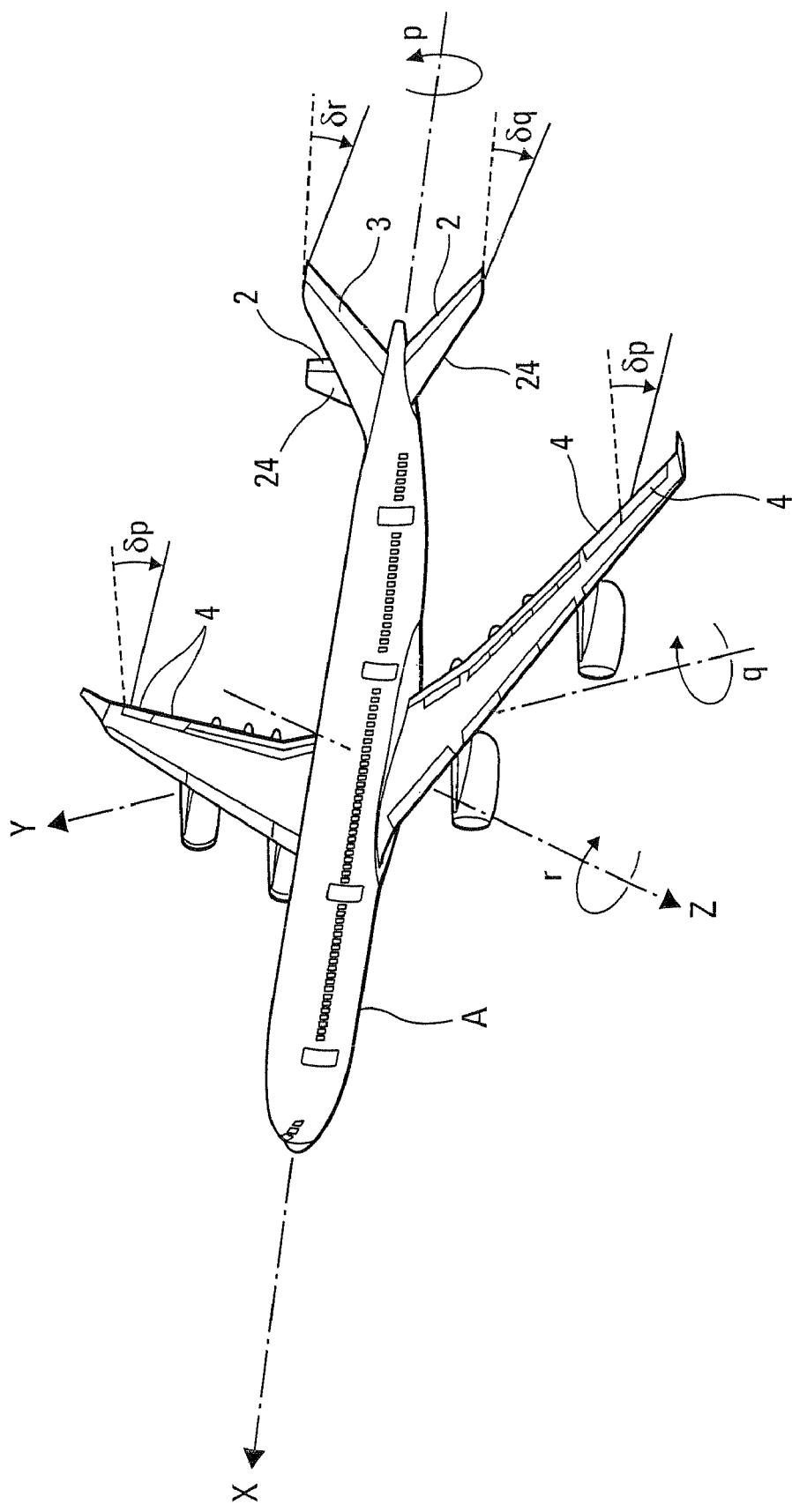
FIG. 2 shows an aircraft to which a device in accordance with the invention is applied.
Figure 3:
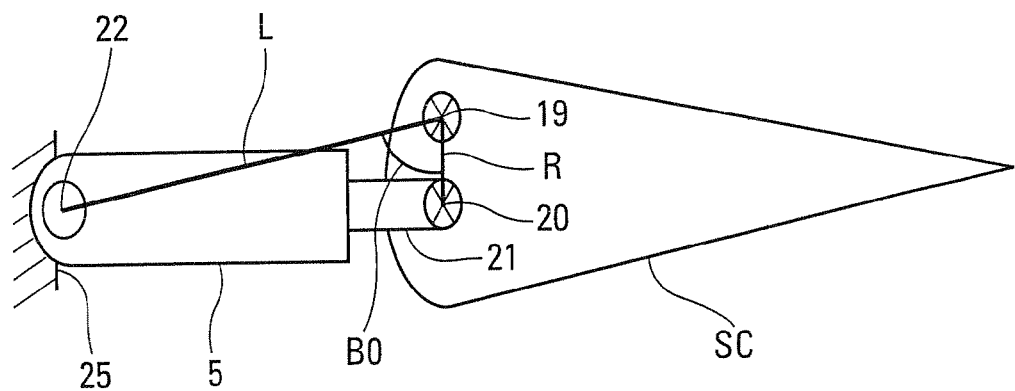
FIGS. 3 and 4 are diagrams making it possible to illustrate various characteristics relating to the deflection of a control surface.
Figure 4:
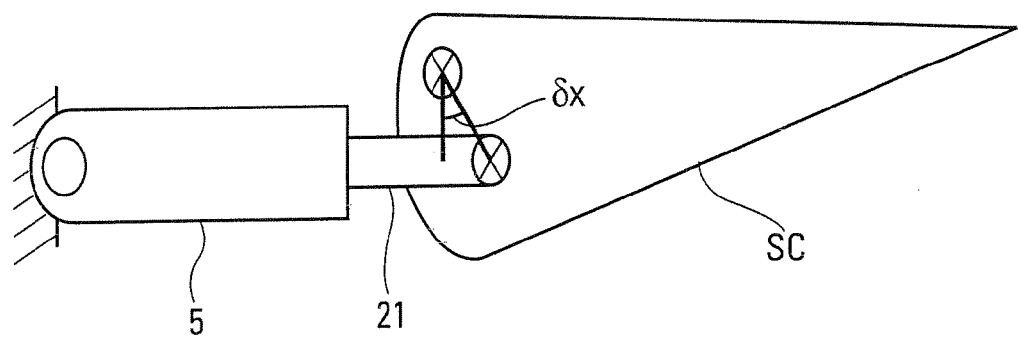

This control surface SC is an aerodynamic surface such as for example an elevator 2, a fin 3 or an aileron 4 which are represented in FIG. 2. This control surface SC is capable of being deflected by at least one actuator 5, as represented in FIGS. 3 and 4, during a flight of the aircraft in such a way as to act on the behavior of said aircraft A in flight. When the control surface SC is deflected, it rotates about an axis and exhibits (as represented in FIG. 4) an angle of deflection δx with respect to a neutral position (represented in FIG. 3). Generally, a control surface SC is formed in such a way as to be able to be deflected (simultaneously or independently) by two actuators 5 which are mounted in parallel.

According to the invention, said device 1 comprises:
- means 6 for receiving the current values of data specified hereinbelow, which relate to the aircraft A and to its flight;
- means 7 which are connected by way of a link 8 to said means 6 and which are formed in such a way as to determine the value Bl of a lever arm of the actuator 5 of the control surface SC;
- means 9 which are connected by way of a link 10 to said means 6 and which are formed in such a way as to calculate, with the aid of current values received from said means 6, at least some of the following hinge moments M1, M2 and M3 (specified further hereinbelow), which are capable of being generated on the control surface SC:
  - an aerodynamic hinge moment M1 which depends in particular on the current values of the dynamic pressure, the local incidence of the control surface SC, and the deflection of said control surface SC;
  - a hinge moment M2 generated by the mass of the control surface SC, which depends in particular on the current value of the load factor, as well as the mass of said control surface SC; and
  - an internal hinge moment M3;
- means 11 which are connected by way of a link 12 to said means 9 and which are intended to compute the sum MT of the various hinge moments M1 to M3 calculated by said means 9; and
- means 13 which are connected respectively by way of links 14 and 15 to said means 7 and 11 and which are formed in such a way as to divide said sum (calculated by said means 11) by the value Bl of the lever arm (determined by said means 7) in such a way as to obtain an estimate of the forces F exerted on said control surface SC.

Said device 1 thus makes it possible to obtain a particularly accurate estimate of the various forces exerted on the control surface SC considered of the aircraft A.

Said forces therefore satisfy the relation F=MT/Bl. These forces are calculated in real time by said device 1, and they may be used to improve in particular the control capability and safety of the aircraft A.

Preferably, said device 1 is embodied in the form of a calculation means which is integrated into a flight control computer 16 of the aircraft A, when the latter is of the type with electric flight controls.

Said device 1 may be applied to all the control surfaces SC of the aircraft A and, in particular, to the elevators 2, to the fins 3 and to the ailerons 4.

Furthermore, said device 1 may form part of a system 17 which comprises, moreover, a set of information sources 18 specified hereinbelow, which is connected by way of a link 19 to said means 6 (which are data acquisition means integrated into the flight control computer 16). Said set 18 is able to determine the various current values of the data relating to the aircraft A and to its flight which are used by the device 1. These current values are transmitted to said acquisition means 6 by way of the link 19. The information sources of said set 18 exist already in general on the aircraft A so that the cost of said system 17 is low, since it does not require the installation of specific sensors and/or gauges. Moreover, the system 17 in accordance with the invention does not entail any negative impact on the mass.

As specified hereinbelow, the various data of which the set 18 determines the current values convey in particular the attitude of the aircraft A, its geometry, its speed and its trajectory. This may in particular involve the incidence, the sideslip, the Mach number, the calculated speed, the deflection of the control surface or surfaces SC considered, rates of roll, pitch and yaw, the position of the center of gravity, as well as the load factor.

According to the invention, said means 7 determine said value Bl of the lever arm with the aid of the following expression:

$$Bl = R \cdot \sin(a\cos[(R - L \cdot \cos(BO + \delta x))/\sqrt{L^2 + R^2 - 2 \cdot L \cdot R \cdot \cos(BO + \delta x)}])$$

in which, as represented in FIGS. 3 and 4:
- sin is the sine;
- cos is the cosine;
- a cos is the inverse of the cosine;
- δx is the current value (which is for example expressed in degrees) of the angle of deflection of the control surface SC;
- R represents the distance (which is for example expressed in millimeters) between a hinge line 19 (which represents the axis about which the control surface SC rotates) and a point of attachment 20 of a rod 21 of the actuator 5 to the control surface SC;
- L represents the distance (which is for example expressed in millimeters) between a point of attachment 22 of the actuator 5 to a structure 25 of the aircraft A and said hinge line 19; and
- BO represents the angle between the segments defining the distances R and L, when the control surface SC is not deflected, as represented in FIG. 3.

Additionally, said means 9 determine said aerodynamic hinge moment M1 with the aid of the following expression:

$$M1 = Pdyn \cdot V\delta x \cdot Ki \cdot (b0 + b1 \cdot i\delta x + b2 \cdot \Delta\delta x + b3 \cdot \delta x + \Delta NL)$$

in which:
- Pdyn is the current value of the dynamic pressure;
- iδx is the current value of the local incidence of the control surface SC;
- δx is the current value of the deflection of the control surface SC;
- Vδx is a reference volume of the control surface SC, taking account of the geometric characteristics of said control surface SC;
- Ki is an interaction term which models the aerodynamic effect of the surrounding control surfaces on the hinge moment calculated;
- b0, b1, b2 and b3 are aerodynamic coefficients which depend on the Mach number and the aerodynamic configuration;
- Δδx is the current value of the deflection of a moveable support of the control surface SC, for example a moveable horizontal stabilizer 24 supporting a fin 2; and
- ΔNL is a nonlinear aerodynamic term.

It will be noted that the hinge moments M1 to M3 depend on the angle of deflection δx of the control surface SC. Also, if instead of using the measured deflection angle δx, the device 1 uses the corresponding deflection orders arising from a flight control computer, it is able to obtain an advantageous phase advance, which in particular allows said device 1 to anticipate the estimation of the forces.

Furthermore, said means 9 determine the hinge moment M2 generated by the mass of the control surface SC, with the aid of the following expression:

$$M2 = \|\vec{n}\|.m\delta x.d\delta x.g$$

in which:
- $\|\vec{n}\|$ is a vector illustrating the current value of the load factor;
- mδx is the mass of the control surface SC;
- dδx represents the distance between a moment axis and the center of gravity of the control surface SC; and
- g is the gravitational acceleration.

For a given control surface SC, only the components (of said load factor vector $\vec{n}$) on the two axes which define a plane which is perpendicular to the axis of rotation of the control surface SC, are taken into account. Thus, M2 may be written:

for an elevator 2:

$$M2 = m\delta q.d\delta q.g.(nx.\sin(iH+\delta q) + nz.\cos(iH+\delta q)),$$

iH being the angle of deflection of the horizontal stabilizer 24;

for a fin 3:

$$M2 = m\delta r.d\delta r.g.(nx.\sin \delta r + ny.\cos \delta r); \text{ and}$$

for an aileron 4:

$$M2 = m\delta p.d\delta p.g.(nx.\sin \delta r + nz.\cos \delta p).$$

As represented in FIG. 2, the aircraft A is defined with respect to three axes X, Y, Z:
- a longitudinal axis X, defining a roll rate p, for which an index p is associated with the associated parameters:
- a lateral axis Y, defining a pitch rate q, for which an index q is associated with the associated parameters; and
- a vertical axis Z, defining a yaw rate r, for which an index r is associated with the associated parameters.

Additionally, said means a determine the internal hinge moment M3, with the aid of the following expression:

$$M3 = Ka.v^2.Bl$$

in which:
- Ka is a damping coefficient of a (passive) auxiliary actuator of the control surface SC, when it comprises two actuators 5 mounted in parallel;
- v is the speed of the rod 21 of this auxiliary actuator; and
- Bl is the lever arm, as specified hereinabove.

This internal hinge moment M3 illustrates the frictional rubbing of the auxiliary actuator, in damped mode, when the control surface SC is capable of being actuated by two actuators mounted in parallel. The force relating to this internal hinge moment M3 has an influence on the dynamic performance of the active actuator 5 and thus on the rate of deflection sought.

Consequently, in a preferred embodiment, said means 11 calculate the total hinge moment MT on the basis of the following expression (1):

$$MT = Pdyn.V\delta x.Ki.(b0+b1.i\delta x+b2.A\delta x+b3.\delta x+\Delta NL)+\|\vec{n}\|.m\delta x.d\delta x.g+Ka.v^2.Bl \quad (1)$$

However, to facilitate the implementation of the invention, the means 9 calculate only those of the various possible hinge moments (in particular M1, M2 and M3) which are characteristic of the control surface SC considered, that is to say those which have a significant influence on the final estimate. This makes it possible in particular to reduce the calculation volume and time, by not calculating the hinge moments of negligible value.

It will be noted that, in the remainder of the description, the index x which is present in the above expressions (with for example Vδx, iδx, Aδx, dδx, mδx and δx) and which corresponds to a general definition for any type of control surface SC, is replaced in particular examples by:
- an index p, when the control surface considered (in particular an aileron 4) acts on the roll axis X;
- an index q, when the control surface considered (in particular an elevator 2) acts on the pitch axis Y; and
- an index r, when the control surface considered (in particular a fin 3) acts on the yaw axis Z.

The present invention is illustrated hereinbelow through the description of two different applications, namely:
- a first application relating to a dual pressurization of an airfoil 2, 3 of the aircraft A; and
- a second application relating to a detection of oscillatory faults in a flight control system.

The first application therefore relates to the activation of a dual pressurization relating to an aircraft control surface SC such as an airfoil, for example an elevator 2 or a fin 3. It is known that in general the airfoils 2, 3 are capable of being actuated by two actuators 5, which are mounted in parallel and which may be either in active mode, or in damped mode. A master computer carries out the slaving by sending a control current to the actuator 5 which is active. The other actuator 5, which is slaved by a slave computer, is forced in damped mode to follow, without resistance, the movement of the airfoil 2, 3. In certain particular cases, the airfoil 2, 3 may experience very sizeable antagonist loads which prevent it from attaining the instructed position sufficiently accurately, or which even disable this airfoil 2, 3. The two actuators 5 are used simultaneously in active mode, so as to have sufficient power to deflect said airfoil 2, 3. In this case one speaks of dual pressurization. To activate such dual pressurization, it is necessary to accurately ascertain all the loads or forces F which are exerted on the airfoil 2, 3 so as to know whether they can be countered by a single actuator 5 or whether the activation of the second actuator is necessary. The device 1 in accordance with the invention makes it possible to accurately estimate these loads (or forces F), as specified hereinabove, and it may therefore be used to control activation of an airfoil dual pressurization. To do this, the forces F calculated by the device 1 are compared with a reference load corresponding to a predetermined limit force that an actuator 5 is able to counter. Beyond this reference load, a dual pressurization is activated, that is to say the second actuator is also brought into its active state.

Concerning this first application, in a first example relating to an elevator 2, the means 11 calculate the following total hinge moment MTδq:

$$MT\delta q = Pdyn.V\delta q.(b0+b1.i\delta q+b2.A\delta q+b3.\delta q+\Delta NL)+\|\vec{n}\|.m\delta q.d\delta q.g$$

Within the framework of this first application, the term $Ka.v^2.Bl$ in the aforesaid expression (1) is negligible. Moreover, the coefficient Ki is equal to 1, since the interaction effects of the fin or fins 3 on the elevators 2 are taken into account in the term ΔNL.

In the above expression for the total hinge moment MTδq, we have:
b0=b0(M, conf), b1=b1(M, conf.), b2=b2(M, conf) and b3=b3(M, conf), where conf corresponds to the configuration (that is to say to the position of the slats and flaps) of the aircraft A and M to the Mach number, b0, b1, b2 and b3 are coefficients which depend only on the Mach number in the smooth configuration of the slats and flaps, and the Mach number and the configuration of the slats and flaps in lift-enhanced configurations;

$$i\delta q = \left(\alpha - \varepsilon + \frac{q \cdot L1}{V}\right)$$

this calculation of $i\delta q$ makes it possible to reduce the incidence of the aircraft A at the local Level of the elevator 2 on the basis of geometric considerations. In this expression, we have:

α: the aerodynamic incidence of the aircraft A;

$$\varepsilon = \varepsilon 0 + \frac{d\varepsilon}{d\alpha} \cdot \alpha:$$

the varying of the incidence at the level of the elevator 2;

ε0: a predetermined constant;
q: the pitch rate of the aircraft A;
L1: the distance between the center of gravity of the aircraft A and that of the elevator 2; and
V: the speed of the aircraft A;
Δδq=iH: the deflection or the positional order of the tail plane (or horizontal stabilizer) 24 on which the elevator 2 is mounted;

$$\Delta NL = \Delta Cmc\delta q(\delta q, M) + \Delta b0\beta \cdot \beta + \Delta b0\delta r \cdot \delta r, \text{ with:}$$

ΔCmcδq: a nonlinearity term. It may include interaction effects if there are several elevators 2. It then depends on the deflection or the positional order of each elevator 2;
β: the aerodynamic sideslip of the aircraft A;
δr: the deflection or positional order of the fin 3; and
Δb0β and Δb0δr: interaction terms for the sideslip and deflection of the fin 3 on the hinge moment of the elevator 2; and $$\|\vec{n}\| \cdot m\delta q \cdot d\delta q \cdot g = Mc\delta qm$$

Mcδqm represents the mass effect, that is to say the hinge moment due to the mass of the elevator 2. It satisfies the following expression:

$$Mc\delta qm = m\delta q \cdot d\delta q \cdot g \cdot [nx \cdot \sin(iH + \delta q) + nz \cdot \cos(iH + \delta q)]:$$

nx and nz: the load factors on the X and Z axes;
δq: the deflection or the positional order of the elevator 2;
iH: the deflection or the positional order of the tail plane 24;
dδq: the distance between the axis of the moment and center of gravity and the mass of the elevator 2;
mδq: the mass of the elevator 2; and
g: the gravitational acceleration.
It will be recalled that:
Pdyn is the dynamic pressure, that is to say the pressure due to the speed of the aircraft A which is exerted on the airfoil 2. It equals half the product of the density of the air (function of the altitude) and the square of the speed of the aircraft A; and
Vδq is a predetermined constant reference volume specific to each airfoil 2 and to each aircraft A.

All the constant terms are specific to each type of aircraft A. The terms ΔCmcδq, Δb0β, Δb0δr and the coefficients b0, b1, b2 and b3 are also identified for each family of aircraft. The other parameters are measured in a standard fashion with the aid of sensors or probes (forming part of said set 18) and are, in general, already accessible in the flight control computer 16 for other applications.

Finally, the expression for the total hinge moment MTδq in the case of the elevator 2 is as follows:

$$MT\delta q = Pdyn \cdot V\delta q \cdot \begin{bmatrix} b0(M, conf) + b1(M, conf) \cdot \\ \left(\alpha - \varepsilon + \frac{q \cdot L1}{V}\right) + b2(M, conf) \cdot iH + \\ b3(M, conf) \cdot \delta q + \Delta Cmc\delta q(\delta q, M) + \\ \Delta b0\delta r \cdot \delta r \end{bmatrix} +$$

$$m\delta q \cdot d\delta q \cdot g \cdot [nx \cdot \sin(iH + \delta q) + nz \cdot \cos(iH + \delta q)]$$

Furthermore, concerning this first application relating to dual pressurization, in the example of a fin 3, the means 11 calculate the following total hinge moment Mtδr:

$$MT\delta r = Pdyn \cdot V\delta r \cdot Ki \cdot (b1 \cdot i\delta r + b3\delta r + \Delta NL)$$

Within the framework of this first application, the term $Ka \cdot v^2 \cdot Bl$ in the aforesaid expression (1) is negligible. The mass term $\|\vec{n}\| \cdot m\delta r \cdot d\delta r \cdot g$ is also negligible, since the elevator 3 is situated in a vertical plane. It is therefore less sensitive to this effect than an airfoil situated in a horizontal plane. The term b0 can also be neglected. The term b2·Δδr is deleted, since the fin 3 is not mounted on a moveable support (Δδr=0), in contrary distinction to the elevator 2 which is mounted on the adjustable tail plane 24.

In the above expression for the total hinge moment MTδr, we have:

Ki=Kmcδr(iH, δq, β, δr): an interaction term for the tail plane 24, the elevator 2 and the sideslip β on the hinge moment of the fin 3, with:
δq: the deflection or positional order of the elevator 2;
δr: the deflection or positional order of the fin 3; and
iH: the deflection or positional order of the tail plane 24;
b0=0, b1=b1(M), b2=0 and b3=b3(M),
b1 and b3 are therefore coefficients which depend only on the Mach number M;

$$i\delta r = \beta - \frac{r \cdot L2}{V}$$

this calculation of iδr makes it possible to reduce the incidence of the aircraft A at the local level of the airfoil 3 on the basis of geometric consideration. In this expression, we have:
β: the aerodynamic sideslip of the aircraft A;
r: the yaw rate of the aircraft A;
L2: the distance between the center of gravity of the aircraft A and that of the fin 3; and
V: the speed of the aircraft A; and
ΔNL=ΔCmcδr(δr, β, M): a nonlinearity term. It may include interaction effects if there are several fins 3. It then depends on the deflection or the positional order of each fin 3.
It is recalled moreover that:
Pdyn is the dynamic pressure, that is to say the pressure due to the speed of the aircraft A which is exerted on the airfoil 3. It equals half the product of the density of the air (function of the altitude) and the square of the speed V of the aircraft A; and
Vδr is a predetermined constant reference volume specific to the airfoil 3 and to the aircraft A.

All the constant terms are specific to each type of aircraft A. The terms $\Delta Cmc\delta r$, $Kmc\delta r$ and the coefficients b1 and b3 must also be identified for each family of aircraft. The other parameters are measured in a standard fashion with the aid of sensors or probes (forming part of said set 18) and are, in general, already accessible in the flight control computer 16 for other applications.

Finally, the expression for the total hinge moment $MT\delta r$ in the case of the elevator 3 is as follows:

$$MT\delta r = Pdyn \cdot V\delta r \cdot Kmc\delta r$$

$$(iH, \delta q, \beta, \delta r) \cdot \left[ b1(M) \cdot \left( \beta - \frac{r \cdot L2}{V} \right) + b3(M) \cdot \delta r + \Delta Cmc\delta r(\delta r, \beta, M) \right]$$

Additionally, as indicated previously, a second application relates to the detection of oscillatory faults in a chain for positional slaving of a control surface SC of an aircraft A, in particular of an aileron 4. It is known that, in a slaving chain, that is to say from a flight control computer up to the control surface SC, numerous electronic components are found which are capable of generating, in fail mode, a parasitic signal which causes the control surface SC to oscillate. This phenomenon is called an oscillatory fault. When it manifests itself in the passband of the actuator 5, its consequences may be catastrophic (generation of excessive load beyond the design ratings). It is therefore necessary to detect and pacify very rapidly any oscillatory fault of this type. To do this, the actual operation of the chain is compared with a reference operation expected in the absence of any fault. More precisely, the actual position of the control surface SC is compared with a position estimated by a behavioral model (which is excited at input by the setpoint of the slaving loop) of this control surface SC.

The estimated position of the control surface SC is obtained by integrating the estimated speed v1 of the rod 21 of the actuator 5 of the control surface SC, which satisfies the following expression:

$$v1 = \frac{v0}{\sqrt{\Delta Pref}} \sqrt{(\Delta P - Pc) - \frac{F}{S}}$$

in which we have:
F: the set of loads which are exerted on the control surface SC and on the actuator 5. The present invention relates to the estimating of these loads;
V0: the speed instructed by the computer;
$\Delta P$: the differential supply pressure at the terminals of the actuator 5 (expressed in bars);
Pc: the pressure at which the isolation valves of the actuator 5 open (expressed in bars);
S: the cross section of the rod 21 of the actuator 5 (expressed in cm$^2$); and
$\Delta Pref$: a predetermined reference pressure (expressed in bars).

The estimation of the forces F exerted on the control surface SC, obtained by the device 1 in accordance with the present invention, thus makes it possible to improve the quality of this behavioral model and therefore the effectiveness of said detection of oscillatory faults.

This second application to the example of an aileron 4 of the aircraft A is illustrated.

In this case, said means 11 calculate the following total hinge moment $MT\delta p$:

$$MT\delta p = Pdyn.V\delta p.(b0+b1.i\delta p+b3.\delta p+\Delta NL)+\|\vec{n}\|.m\delta p.d\delta p.g+Ka.v^2.Bl$$

Within the framework of this example, the interaction term Ki in the aforesaid expression (1) is equal to 1, since there is no other surrounding control surface having a significant interaction effect. Moreover, the term $b2.\Delta\delta p$ has been deleted, since the ailerons 4 are not mounted on moveable supports (hence $\Delta\delta p=0$).

In the above expression for the hinge moment $MT\delta p$, we have:
b0=b0 (M, conf), b1=(M, conf), b2=0 and b3 (M, conf),
b0, b1 and b3 are coefficients dependant only on the Mach number in the smooth configuration of the slats and flaps, and dependant on the Mach number and the configuration of the slats and flaps in enhanced-lift configurations;
$i\delta p$: the aerodynamic incidence angle $\alpha$ of the aircraft A referred to the center of gravity of the aileron 4, which is such that:

$$\begin{cases} i\delta p = \alpha + \dfrac{p \cdot L3}{V}, \text{ for a right aileron 4,} \\ i\delta p = \alpha - \dfrac{p \cdot L3}{V}, \text{ for a left aileron 4,} \end{cases}$$

with:
p: the roll rate;
L3: the distance (constant) between the center of gravity of the aircraft A and that of the aileron 4; and
V: the speed of the aircraft A;
$\Delta NL = \Delta Cmc\delta p$: a nonlinearity term. It may include interaction effects if there are several ailerons 4. It then depends on the deflection or positional order of each aileron 4;
$\|\vec{n}\|.m\delta p.d\delta p.g = MC\delta pm$ represents the mass effect, that is to say the hinge moment due to the mass of the aileron 4. It satisfies the following expression:

$$Mc\delta pm = (nx. \sin \delta p + nz. \cos \delta p).d\delta p.m\delta p.g, \text{ with:}$$

nx and nz: the load factors on the X and Z axes;
$\delta p$: the deflection or positional order of the aileron 4;
$d\delta p$: the distance between the axis of the moment and the center of gravity of the aileron 4;
$m\delta p$: the mass of the aileron 4; and
g: the gravitational acceleration; and
$Ka.v^2.Bl$: the frictional rubbing of the adjacent actuator in damped mode, in the case of a configuration with two actuators 5 per aileron 4.

It is recalled that:
Pdyn is the dynamic pressure, that is to say the pressure due to the speed of the aircraft A which is exerted on the aileron 4. It equals half the product of the density of the air (dependant on the altitude) and the square of the speed V of this aircraft A; and
$V\delta p$ is a predetermined constant reference volume specific to each aileron 4 and to each aircraft A.

All the constant terms are specific to each type of aircraft A. The terms $\Delta Cmc\delta q$ and the coefficients b0, b1, and b3 must also be identified for each family of aircraft. The other parameters are measured in a standard fashion with the aid of sensors or probes (forming part of said set 18) and are, in general, already accessible in the flight control computer 16 for other applications.

Finally, the expression for the total hinge moment $MT\delta p$ in the case of an aileron 4 is as follows:

$$MT\delta p = Pdyn \cdot V\delta p \cdot \left[b0 + b1 \cdot \left(\alpha \pm \frac{p \cdot L3}{V}\right) + b3 \cdot \delta p + \Delta Cmc\delta p\right] +$$
$$(nx \cdot \sin\delta p + nz \cdot \cos\delta p) \cdot d\delta p \cdot m\delta p \cdot g + Ka \cdot v^2 \cdot Bl$$

The invention claimed is:

1. A method for estimating forces exerted on at least one aircraft control surface comprising the successive steps of:
   a) generating current aircraft flight data;
   b) determining, from the generated aircraft flight data, a value Bl based on current deflection data and geometrical characteristics of a lever arm actuator of the at least one aircraft control surface;
   c) calculating, by a processor, from the determined value Bl based on the current deflection data and the geometrical characteristics, at least one hinge moment, wherein the at least one hinge moment is selected from the following hinge moments;
      c1) an aerodynamic hinge moment M1 which depends on current values of dynamic pressure, local incidence of the at least one aircraft control surface, and deflection of said at least one aircraft control surface;
      c2) a hinge moment M2 generated by mass of the at least one aircraft control surface, which based on the current depends on a current value of load factor; and
      c3) an internal hinge moment M3;
   d) summing each hinge moment calculated in step c); and
   e) dividing the sum obtained in step d) by the value Bl determined in step b) to obtain an estimate of the forces exerted on said at least one aircraft control surface,
   wherein in step b), said value Bl is determined according to the following expression:

$Bl = R \cdot \sin(\alpha \cos[(R-L \cdot \cos(BO+\delta x))/\sqrt{\text{square root}}$ over $(L^2+R^2-2 \cdot L \cdot R \cdot \cos(BO+\delta x))\}])$ in which:

δx is a value of the current deflection data of the at least one aircraft control surface;
   R represents distance between a hinge line and a point of attachment of a rod of the lever arm actuator to the at least one aircraft control surface;
   L represents distance between a point of attachment of the lever arm actuator to a structure of the aircraft and said hinge line; and
   BO represents an angle between segments defining the distances R and L, when the at least one aircraft control surface is not deflected.

2. The method as claimed in claim 1, wherein in step c1), the aerodynamic hinge moment M1 is determined according to the following expression:

$M1 = Pdyn \cdot V\delta x \cdot Ki \cdot (b0+b1 \cdot i\delta x+b2 \cdot \Delta\delta x+b3 \cdot \delta x+\Delta NL)$ in which:

Pdyn is a current value of the dynamic pressure;
   iδx is a current value of the local incidence of the at least one aircraft control surface;
   δx is current value of the deflection of the at least one aircraft control surface;
   Vδx is a reference volume of the at least one aircraft control surface;
   Ki, ΔNL, b0, b1, b2 and b3 are coefficients; and
   Δδx is a current value of deflection of a moveable support of the at least one aircraft control surface.

3. The method as claimed in claim 1, wherein in step c2), the hinge moment M2 generated is determined according to the following expression:

$M2 = \|\vec{n}\| \cdot m\delta x \cdot d\delta x \cdot g$ in which:

$\|\vec{n}\|$ is a current value of the load factor;
   mδx is the mass of the at least one aircraft control surface;
   dδx represents distance between a moment axis and a center of gravity of the at least one aircraft control surface; and
   g is gravitational acceleration.

4. The method as claimed in claim 1, wherein in step c3), the internal hinge moment M3 is determined according to the following expression:

$M3 = Ka \cdot v^2 \cdot Bl$ in which:

Ka is a damping coefficient of an auxiliary actuator of the at least one aircraft control surface; and
   v is speed of a rod of the auxiliary actuator.

5. The method as claimed in claim 1, wherein said at least one aircraft control surface corresponds to an elevator, and wherein in step d), the sum is calculated according to the following:

$MT\delta q = Pdyn \cdot V\delta q \cdot (b0+b1 \cdot i\delta q+b2 \cdot \Delta\delta q+b3 \cdot \delta q+\Delta NL)+\|\vec{n}\| \cdot m\delta q \cdot d\delta q \cdot g$ in which:

Pdyn is a current value of the dynamic pressure;
   iδq is a current value of the local incidence of the at least one aircraft control surface;
   δq is a current value of the deflection of the at least one aircraft control surface;
   Vδq is a reference volume of the at least one aircraft control surface;
   ΔNL, b0, b1, b2 and b3 are coefficients;
   Δδq is a current value of deflection of a moveable support of the at least one aircraft control surface;
   $\|\vec{n}\|$ is current value of the load factor;
   mδq is the mass of the at least one aircraft control surface;
   dδq represents distance between a moment axis and a center of gravity of the at least one aircraft control surface; and
   g is gravitational acceleration.

6. The method as claimed in claim 1, wherein said at least one aircraft control surface corresponds to a fin, and wherein in step d), the sum is calculated according to the following:

$MT\delta r = Pdyn \cdot V\delta r \cdot Ki \cdot (b1 \cdot i\delta r+b3 \cdot \delta r+\Delta NL)$ in which:

Pdyn is a current value of the dynamic pressure;
   iδr is a current value of the local incidence of the at least one aircraft control surface;
   δr is a current value of the deflection of the at least one aircraft control surface;
   Vδr is a reference volume of the at least one aircraft control surface; and
   Ki, ΔNL, b1 and b3 are coefficients.

7. The method as claimed in claim 1, wherein said at least one aircraft control surface corresponds to an aileron, and wherein in step d), the sum is calculated according to the following:

$MT\delta p = Pdyn \cdot V\delta p \cdot (b0+b1 \cdot i\delta p+b3 \cdot \delta p+\Delta NL)+\|\vec{n}\| \cdot m\delta p \cdot d\delta p \cdot g+Ka \cdot v^2 \cdot Bl$ in which:

Pdyn is a current value of the dynamic pressure;
   iδp is a current value of the local incidence of the at least one aircraft control surface;
   δp is a current value of the deflection of the at least one aircraft control surface;
   Vδp is a reference volume of the at least one aircraft control surface;
   ΔNL, b0, b1 and b3 are coefficients;
   $\|\vec{n}\|$ is a current value of the load factor;

mδp is the mass of the control surface;

dδp represents distance between a moment axis and a center of gravity of the at least one aircraft control surface;

g is gravitational acceleration;

Ka is a damping coefficient of an auxiliary actuator of the at least one aircraft control surface; and v is speed of a rod of the auxiliary actuator.

8. An aircraft control surface force estimator, which comprises:

a current data receiver unit that receives current aircraft data;

a lever arm valuation unit that determines, from data from the current data receiver unit, a value Bl based on current deflection data and geometrical characteristics of a lever arm actuator of at least one aircraft control surface;

a hinge moment calculator that calculates, from the determined value Bl, at least one hinge moment of the at least one aircraft control surface, wherein the at least one hinge moment is selected from the following hinge moments:

an aerodynamic hinge moment M1 which depends on current values of dynamic pressure, local incidence of the at least one aircraft control surface, and deflection of said at least one aircraft control surface;

a hinge moment M2 generated by mass of the at least one aircraft control surface, which depends on current value of load factor; and an internal hinge moment M3;

a hinge moment summation unit that sums each of the hinge moments calculated by said hinge moment calculator; and a force estimator unit that divides the sum calculated by said hinge moment summation unit by the value Bl, determined by said lever arm valuation unit, to obtain an estimate of the forces exerted on said at least one aircraft control surface, wherein the lever arm valuation unit determines said value Bl according to the following expression:

$Bl = R \cdot \sin(\alpha \cos[(R - L \cdot \cos(BO + \delta x))/\sqrt{L^2 + R^2 - 2 \cdot L \cdot R \cdot \cos(BO + \delta x)}])$ in which:

δx is a value of the current deflection data of the at least one aircraft control surface;

R represents distance between a hinge line and a point of attachment of a rod of the lever arm actuator to the at least one aircraft control surface;

L represents distance between a point of attachment of the lever arm actuator to a structure of the aircraft and said hinge line; and BO represents an angle between segments defining the distances R and L, when the at least one aircraft control surface is not deflected.

9. A flight control computer, which comprises the aircraft control surface force estimator of claim 8.

10. A system for estimating the forces exerted on at least one control surface of an aircraft, which comprises:

the aircraft control surface force estimator of claim 8; and a current data unit that determines current aircraft data and transmits the determined data to the current data receiver unit.

11. An aircraft, which comprises the flight control computer of claim 9.

12. An aircraft, which comprises the system of claim 10.

* * * * *